United States Patent [19]
Kehoe et al.

[11] 3,718,676
[45] Feb. 27, 1973

[54] PREPARATION OF CARBOXYLIC ACIDS

[75] Inventors: Lawrence J. Kehoe, Huntington Woods; Raymond A. Schell, Berkley, both of Mich.

[73] Assignee: Ethyl Corporation, New York, N.Y.

[22] Filed: March 20, 1970

[21] Appl. No.: 21,473

Related U.S. Application Data

[63] Continuation-in-part of Ser. No. 776,819, Nov. 18, 1968, abandoned.

[52] U.S. Cl. ............................... 260/413, 260/533 A
[51] Int. Cl. ............................................. C08h 17/36
[58] Field of Search ........................... 260/413, 533 R

[56] References Cited

UNITED STATES PATENTS

| | | | |
|---|---|---|---|
| 3,644,443 | 2/1972 | Shubkin | 260/413 |
| 3,661,957 | 5/1972 | Shubkin | 260/413 |
| 3,668,249 | 6/1972 | Fenton | 260/413 X |
| 2,876,254 | 3/1959 | Jenner et al. | 260/486 |
| 3,501,518 | 3/1970 | Kutepow et al. | 260/468 |

*Primary Examiner*—Lewis Gotts
*Assistant Examiner*—Ethel G. Love
*Attorney*—Donald L. Johnson

[57] ABSTRACT

A process is described for preparing carboxylic acids from olefins, water and carbon monoxide in a liquid reaction medium using a combination of a tin or germanium salt and a platinum salt as the catalyst. Olefins having at least one α-carbon-to-carbon double bond and containing up to about 30 carbon atoms are useful reactants. Suitable reaction media are alkyl ketones and alkyl ethers.

18 Claims, No Drawings

PREPARATION OF CARBOXYLIC ACIDS

CROSS REFERENCE TO RELATED APPLICATION

This application is a continuation-in-part of Ser. No. 776,819, filed Nov. 18, 1968, now abandoned.

BACKGROUND OF THE INVENTION

This invention is directed to a catalytic process for preparing carboxylic acids from olefins, carbon monoxide and water.

The catalytic reaction of olefins with carbon monoxide and water to produce carboxylic acids is known in the art; this reaction will be referred to herein as carboxylation of olefins. The catalysts which are utilized in the art are nickel or cobalt carbonyls or their precursors, either alone or in combination with other catalytic components and promoters. The following United States patents are directed to representative catalytic processes of this type: U.S. Pat. Nos. 2,448,368; 2,593,440; 2,658,075; 2,768,968; and 3,064,040. The cobalt and nickel catalysts appear to be effective with both terminal (or α-olefins) and internal olefins. The reaction temperatures and pressures utilized with the cobalt or nickel catalysts are generally high.

The process of the present invention provides a unique catalyst system, for the carboxylation of olefins, which does not contain either nickel or cobalt; the present process can be carried out at relatively mild temperatures. The present catalyst system is also selective with regard to the type of olefin which can be carboxylated as well as the distribution of product obtained.

SUMMARY OF THE INVENTION

A catalytic process for preparing carboxylic acids which comprises reacting a $C_2$–$C_{30}$ olefin characterized by having at least one α-carbon-to-carbon double bond and a hydrogen atom on the two-carbon atom of said double bond with carbon monoxide and water in a liquid reaction medium using a combination of a tin or germanium salt and a platinum salt as the catalyst.

DESCRIPTION OF THE PREFERRED EMBODIMENTS

An embodiment of this invention is a process for preparing carboxylic acids by reacting an olefin characterized by having at least one α-carbon-to-carbon double bond and a hydrogen atom on the two-carbon atom of said double bond with carbon monoxide and water in a liquid reaction media using as the catalyst a combination of a salt of a metal selected from tin and germanium and a salt of platinum. Another embodiment features a $C_2$–$C_{30}$ olefin reactant and a molar ratio of olefin; water of less than 1:8 and preferably from 1:1 to about 1:7, said reaction being carried out at temperatures of from about 75° to about 150° C. A preferred embodiment features the use of an α-monoolefin as the reactant. A liquid reaction medium is essential in the present process; preferred media are $C_3$–$C_{11}$ alkyl ketones and $C_4$–$C_{10}$ alkyl ethers. A more preferred catalyst combination is one containing a tin salt; the combination of a tin halide and a platinum halide is an especially preferred catalyst. It is also preferred that the atomic ratio of tin:platinum in the catalyst combination be greater than about 5:1. Other specific and preferred embodiments of this process will be presented in the disclosure which follows:

Olefins which are useful reactants in the practice of this invention are unsaturated $C_2$–$C_{30}$ hydrocarbons characterized by having (1) at least one alpha carbon-to-carbon double bond and (2) a hydrogen atom on the two-carbon atom of said double bond. Useful olefins include those having one carbon-to-carbon double bond, that is, monoolefins, as well as those having two or more carbon-to-carbon double bonds. These olefins may be acyclic olefins, straight chain or branched chain olefins, cyclic olefins, aryl substituted olefins, and the like. Examples of useful olefins are styrene, cyclohexene, 1,5-hexadiene, 1,5-cyclooctadiene, cyclooctene, 1,3-butadiene, 4-phenylbutene-1, 1,5-undecadiene, 9-phenyl-4,6,8-trimethylnonene-1, 1,4,7-triacontatriene, and the like. Preferred olefins are non-aromatic, acyclic olefins. Examples of preferred olefins are triacontene-1, 1,4-pentadiene, 1,6-heptadecadiene, and the like. Especially preferred olefins are the α-monoolefins exemplified by octene-1, nonene-1, decene-1, tetradecene-1, dodecene-1, ethylene, 4-n-butylhexene-1, propylene, eicosene-1, pentene-1, butene-1, pentacosene-1, 4-methylpentene-1, 3-ethylhexene-1, tetracosene-1, heptadecene-1, octadecene-1, and the like.

Commercial mixtures of predominantly α-olefins are also quite useful. These commercial mixtures are generally a mixture of various homologous olefins such as $C_{12}$, $C_{14}$, $C_{16}$ olefins; $C_{12}$, $C_{14}$ olefins; $C_{13}$, $C_{15}$, $C_{17}$ olefins; $C_{11}$, $C_{12}$, $C_{13}$, $C_{14}$, $C_{15}$ olefins; $C_{18}$, $C_{20}$, $C_{22}$ olefins; $C_{14}$, $C_{15}$ olefins; $C_4$, $C_6$, $C_8$ olefins; $C_6$, $C_9$, $C_{12}$ olefins, and the like. These mixed olefins are synthesized for example by the Ziegler catalyzed polymerization of low molecular weight olefins such as ethylene or propylene; or by the dehydrogenation of suitable paraffins. The mixed α-olefins thus obtained might also contain minor amounts of other compounds such as non α-olefins, non-homologous olefins, olefins with two or more double bonds, and non-olefin components. In any case, the mixed product obtained from such a commercial synthesis need not be separated into the individual components to be useful. Mixtures containing $C_6$–$C_{24}$ α-olefins primarily, are especially useful.

The amount of water used in the present process is generally based on the amount of olefin reactant in the system. At least 1 mole of water should be provided for each reactive double bond in the olefin reactant; for an α-monoolefin then, an $H_2O$:olefin molar ratio of 1:1 should be used. Generally, an amount of water in excess of the 1:1 olefin to water molar ratio is used. Molar ratios of water to olefin ranging from 1:1 up to about 7:1 are used. When the water to olefin molar ratio is higher than about 7:1, for example 8:1, the reaction rate is reduced considerably; thus, a substantial excess of $H_2O$ is to be avoided. A water to olefin molar ratio of about 2:1 is most preferred.

The carbon monoxide reactant is ordinarily introduced into the reaction mixture as a gas. Sufficient carbon monoxide is added to provide at least 1 mole of carbon monoxide for each reactive carbon-to-carbon double bond in the olefin reactant. Ordinarily, a stoichiometric excess of carbon monoxide is used in the process. Being a gaseous reactant, the amount of carbon monoxide is measured in terms of pressure.

Generally, carbon monoxide pressures ranging from 500 pounds per square inch (p.s.i.) up to 15,000 p.s.i. are used; pressures of from 1,000 p.s.i. to about 5,000 p.s.i. are preferred.

The catalyst which is used in the present process is a combination of (a) a salt of tin or germanium and (b) a salt of platinum. Preferred salts are the inorganic salts and particularly the halides of said metals wherein the halide has an atomic number of at least 17. The chlorides are especially preferred. Examples of suitable salts of tin and germanium are stannous and stannic chlorides, bromides and iodides, germanium di- and tetrachlorides, germanium tetrabromides, germanium tetrachlorides, stannous and stannic sulfates, the phosphates, borates, nitrates and like compounds of tin and germanium.

Examples of suitable platinum salts are platinous chloride, platinic bromide, platinic chloride, platinous iodide, platinic sulfate, $Li_2PtI_6$, $K_2PtBr_6$, $K_2PtI_4$, potassium chloroplatinate, $K_2PtCl_4$, $Na_2PtBr_6$, and the phosphates, nitrates, borates and the like of platinum.

Especially useful catalyst combinations are $SnCl_2$ and $K_2PtCl_6$; $SnCl_2 \cdot 2H_2O$ and $H_2PtCl_6 \cdot H_2O$; $SnCl_2 \cdot 2H_2O$, and $K_2PtCl_6$; $PtCl_4$ and $SnCl_2$; and $PtCl_4$ and $SnCl_2 \cdot 2H_2O$.

Special preparation of the catalysts does not appear to be required. In general the suitable metal salts are added directly into the reactant/reaction medium mixture. The ratio of tin or germanium salt to the platinum salt used, can be varied. Amounts of tin or germanium salt to platinum salt sufficient to provide a tin (or germanium):platinum atomic ratio ranging from about 1:1 up to about 10:1 can be used; amounts of suitable salts sufficient to provide a tin (or germanium):platinum atomic ratio of greater than 5:1, that is, 5:1, 6:1, and higher is preferred. The total amount of the catalyst combination which can be employed in the present process may be varied widely; in general, a sufficient amount of the catalyst is provided to permit the reaction to proceed at a reasonable rate under the conditions such as temperature, pressure, etc., set for the process. Generally, an amount of the catalyst combination which provides about 0.0001 to about 0.2 moles of contained platinum metal per mole of water reactant is charged into the reactor.

It is essential that the present process be carried out in a liquid reaction medium. The liquid reaction media which are especially useful in the present process are the alkyl ketones having up to about 11 carbon atoms such as diisobutyl ketone, cyclohexanone, methyl ethyl ketone, methyl isobutyl ketone, diamyl ketone, cyclohexyl ethyl ketone and the like; and alkyl ethers having from four to about 16 carbon atoms such as morpholine, diethyl ether, 1,3-dioxane, di-n-butylether, di-n-hexylether, di-2-ethylhexyl ether, $C_1$–$C_4$ dialkyl glycol ethers and polyethers such as 1,2-diethoxy ethane, bis[2-(2-methoxyethoxy)ethyl]ether, bis(2-butoxyethyl)ether, 1,2-di-propoxy propane and the like. Mixtures of these reaction media can also be used.

Especially preferred reaction media are acetone and 1,2-dimethoxy ethane.

The amount of reaction medium used in the present process may be varied over a wide range. For optimum results, sufficient reaction medium should be present to effect essentially complete miscibility of the reactants, that is, the water and olefin, at the reaction temperature; however, the process can be carried out in the presence of more or less than this "optimum results" amount of the reaction medium. Amounts of the reaction medium ranging from about 10 percent up to about 200 percent by weight of the total water/olefin charge can be used.

The temperature at which the present process is carried out may also be varied. In general, temperatures in excess of about 30° C. are used. Reaction temperatures from about 75° C. to about 150° C. are conveniently used; the preferred reaction temperature range is from 75° to about 110° C.

The process is generally carried out at pressures above atmospheric. As pointed out above, one of the reactants, namely carbon monoxide, is ordinarily introduced as a gas; thus, the pressure of the system is predominantly that of the carbon monoxide. However, where other components of the process, for example, the reaction media or olefin, (if it is ethylene for example) have any appreciable vapor pressure at the reaction temperature, then these materials also contribute to the pressure of the present process. The reaction pressures ranging from 500 to about 15,000 pounds per square inch (p.s.i.) can conveniently be used. Pressures ranging from about 1,000 p.s.i. to about 5,000 p.s.i. are preferred.

Although it has been found that the liquid reaction medium does affect the miscibility of the olefin/water reactants, this does not appear to be the only function of the liquid reaction medium; it is also theorized that the liquid reaction medium functions in some way as an activating agent for the catalyst combination. Whatever the mechanism of its activity, the presence of the aforesaid liquid reaction medium is required in the reaction process.

Reaction time is variable and is dependent on the nature of the reactants, amount of catalyst, temperature, pressure and other such reaction variables. A reaction time suitable for affording a reasonable and economic yield of acid is generally chosen.

Reaction times ranging from as low as 30 minutes up to 24 hours can be used.

The present process involves the reaction of an olefin, $H_2O$ and CO in the presence of a liquid reaction medium to produce carboxylic acids having at least one carbon atom more than the olefin reactant. This reaction is illustrated by the following equation; R in this equation represents any of the hydrocarbon moieties disclosed above.

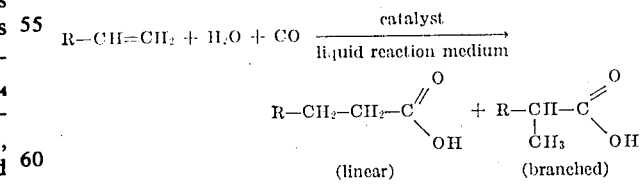

In addition to producing acids, the present catalyst system also effects olefin isomerization (double bond migration).

As the equation illustrates, the product obtained is a mixture of linear and branched acids. Ordinarily it is expected that the ratio of linear to branched acids in the product would be about 1:1; that is, the product would contain about 50 per cent linear acid and 50 percent branched acid. The ability of a catalytic system to increase the relative amount of linear acid in the product is sometimes referred to as its selectivity. Thus, if the reaction product contained about 50 percent linear acid and 50 percent branched acid, the process would have virtually no selectivity. An outstanding feature of the present process is that the product obtained contains more than 75 percent linear acid and generally over 80 percent. Thus, the present catalyst system has high selectivity.

This mixture of acid isomers obtained in the present process may be separated, if desired, by any suitable separation methods available, such as fractional distillation, selected absorption, and the like. In general the mixtures of acids may be used as such without any separation of isomers.

The following examples are presented to illustrate the process of the present invention. All parts and percentages are by weight unless otherwise specified.

In Examples 1–4, conversion of olefin was calculated as follows:

Percent conversion
$$= \frac{\text{Starting olefin charged} - \text{olefins}^1 \text{ recovered}}{\text{starting olefin charged}} \times 100$$

[1] These olefins include isomerized starting olefins.

In Examples 5–10, conversion of olefins was calculated as follows:

Percent conversion
$$= \frac{\text{Starting olefin charged} - \text{starting olefin recovered}}{\text{starting olefin charged}} \times 100$$

EXAMPLE 1

A suitably sized autoclave fitted with a magnetic stirrer was charged with 24.7 parts (0.092 moles) of dodecene-1, 1.6 parts of (0.092 moles) of water, about 38 parts of acetone, 1.0 parts (0.002 moles) of $H_2PtCl_6 \cdot 6H_2O$, and 2.3 parts (0.010 moles) of $SnCl_2 \cdot 2H_2O$. The autoclave was sealed, flushed twice with carbon monoxide and pressured to 3725 p.s.i. with CO. The autoclave was then heated with stirring to 90° C. and the pressure rose to 4,280 p.s.i. The reaction was continued at this temperature for 5 hours. At the end of this time, the vessel was cooled and the liquid product was discharged.

The product was analyzed by Gas Liquid Chromatography (glc). Conversion of olefin was 94 percent; the acid yield was 64 percent, of which 89 percent was n-tridecanoic acid.

When about 49 parts of 1,4-dioxane were substituted for the acetone in a system substantially equivalent to Example 1, the olefin conversion was 67 percent, with 58 percent yield of acid product of which 80 percent was n-tridecanoic acid.

In a similar manner, when about 42 parts of 1,2-dimethoxyethane was used in place of the acetone in Example 1, the olefin conversion was 81 percent; the acid yield was 58 percent of which 86 percent was n-tridecanoic acid.

EXAMPLE 2

A suitably sized autoclave fitted with a magnetic stirrer was charged with 23.7 parts (0.088 moles) of dodecene-1, 1.7 parts (0.094 moles) of water, about 38 parts of acetone, 1.0 parts (0.002 moles) of $H_2PtCl_6 \cdot 6H_2O$, and 3.45 parts (0.015 moles) of $SnCl_2 \cdot 2H_2O$. The autoclave was sealed, flushed twice with carbon monoxide and pressured to 3,725 p.s.i. with CO. The autoclave was then heated with stirring to 90° C. and the pressure rose to 4,200 p.s.i. The reaction was continued at this temperature for 5 hours. At the end of this time, the vessel was cooled and the liquid product was discharged.

The product was analyzed by Gas Liquid Chromatography (glc). Conversion of olefin was 82 percent; the acid yield was 77 percent, of which 83 percent was n-tridecanoic acid.

Good yields are also obtained when the acetone in Example 2 is replaced with 25 parts of methyl ethyl ketone, 30 parts of tetrahydrofuran, 35 parts of bis[2-(2-ethoxyethoxy)ethyl] ether, 13 parts of morphonine, 20 parts cyclohexanone, 40 parts of methyl isobutyl ketone, 50 parts of diisoamyl ether, 32 parts of diisobutyl ketone, 42 parts of 1,2-bis[2-(2-butoxyethoxy)ethoxy] ethane, 23 parts of di-n-pentyl ketone or 31 parts of diethylether.

EXAMPLE 3

A suitably sized autoclave fitted with a magnetic stirrer was charged with about 24 parts (0.089 moles) of dodecene-1, 3.4 parts (0.189 moles) of water, about 37 parts of acetone, 1.0 parts (0.002 moles) of $H_2PtCl_6 \cdot 6H_2O$, and 2.3 parts (0.010 moles) of $SnCl_2 \cdot 2H_2O$. The autoclave was sealed, flushed twice with carbon monoxide and pressured to 3,725 p.s.i. with CO. The autoclave was then heated with stirring to 90° C.; the reaction was continued at this temperature for 5 hours. At the end of this time, the vessel was cooled and the liquid product was discharged.

The product was analyzed by Gas Liquid Chromatography (glc). Conversion of olefin was 95 percent; the acid yield was 86 percent, of which 88 percent was n-tridecanoic acid.

Using 6.8 parts of water and about 34 parts of acetone in Example 3, the conversion was 78 percent, the acid yield was 80 percent, of which 89 percent was n-tridecanoic acid.

When 13.6 parts of water and about 40 parts of acetone were used in Example 3, the conversion was 10 percent, the acid yield was 22 percent of which 100 percent was n-tridecanoic acid.

These data illustrate the effect of excess water on the present reaction.

EXAMPLE 4

A suitably sized autoclave fitted with a magnetic stirrer was charged with about 24 parts (0.089 moles) of dodecene-1, 1.6 parts (0.089 moles) of water, about 38 parts of acetone, 0.5 parts (0.001 moles) of $H_2PtCl_6 \cdot 6H_2O$, and 1.15 parts (0.005 moles) of $SnCl_2 \cdot 2H_2O$. The autoclave was sealed, flushed twice with carbon monoxide and pressured to 3725 p.s.i. with Co. The autoclave was then heated with stirring to 90° C.; the reaction was continued at this temperature for 5 hours. At the end of this time, the vessel was cooled and the liquid product was discharged.

The product was analyzed by Gas Liquid Chromatography (glc). Conversion of olefin was 83 percent;

the acid yield was 70 percent, of which 93 percent was n-tridecanoic acid.

Using 0.13 parts of $H_2PtCl_6 \cdot H_2O$ and 0.28 parts of $SnCl_2 \cdot 2H_2O$ as the catalyst in Example 4, the conversion was 58 percent, the acid yield being 98 percent of which 89 percent was n-tridecanoic acid.

The reaction of Example 4 will proceed in an analogous manner when the reaction temperature is 75° C., 85° C., 95° C., 100° C., or 110° C.

EXAMPLE 5

A suitably sized autoclave fitted with a magnetic stirrer was charged with 24.5 parts (0.091 moles) of dodecene-1, 3.0 parts (.167 moles) of water, 37.6 parts of acetone, 0.5 parts (0.001 moles) of $H_2PtCl_6 \cdot H_2O$, and 0.7 parts (0.003 moles) of $SnCl_2 \cdot 2H_2O$. The autoclave was sealed, flushed twice with carbon monoxide and pressured to 3,750 p.s.i. with CO. The autoclave was then heated with stirring to 90° C. and the pressure rose to 4,800 p.s.i. The reaction was continued at this temperature for 1 hour. At the end of this time, the vessel was cooled and the liquid product was discharged.

The product was analyzed by Gas Liquid Chromatography (glc). Conversion of olefin was 100 percent; the acid yield was 14 percent, of which 86 percent was n-tridecanoic acid.

When a catalyst combination 1.0 part $H_2PtCl_6 \cdot H_2O$ and 2.3 parts of $SnCl_2 \cdot 2H_2O$ was used in Example 5, the olefin conversion was 100 percent and the acid yield was 71 percent of which 82 percent was n-tridecanoic acid.

EXAMPLE 6

A suitably sized autoclave fitted with a magnetic stirrer was charged with 23.5 parts (0.277 moles) of hexene-1, 4.9 parts (0.270 moles) of water, 120 parts of acetone, 3.1 parts (0.006 moles) of $H_2PtCl_6 \cdot H_2O$, and 6.9 parts (0.030 moles) of $SnCl_2 \cdot 2H_2O$. The autoclave was sealed, flushed twice with carbon monoxide and pressured to 2,500 p.s.i. with CO. The autoclave was then heated with stirring to 90° C. and the pressure rose to 3,130 p.s.i. The reaction was continued at this temperature for 5 hours. At the end of this time, the vessel was cooled and the liquid product was discharged.

The product was analyzed by Gas Liquid Chromatography (glc). Conversion of olefin was 100 percent; the acid yield was 76 percent, of which 79 percent was n-heptanoic acid.

The following catalyst combinations produce good results when used in the process of Example 6:

0.025 moles $SnBr_2$/0.005 moles $K_2PtCl_6$
0.010 moles $GeCl_4$/0.0015 moles $H_2PtCl_6$
0.030 moles $SnCl_2$/ 0.010 moles $PtCl_4$
0.005 moles $SnSo_4$/0.001 moles $Pt(SO_4)_2$
0.020 moles $GeI_4$/0.005 moles $Pt(P_2O_7)_2$
0.0014 moles $SnCl_2$/0.00027 moles $K_2PtCl_6$
0.250 moles $GeBr_4$/0.054 moles $PtBr_4$
0.010 moles $SnCl_4$/0.010 moles $K_2PtCl_4$
0.020 moles $SnCl_2 \cdot 2H_2O$/0.002 moles $H_2PtCl_6 \cdot H_2O$

EXAMPLE 7

A suitably sized autoclave fitted with a magnetic stirrer was charged with 72.1 parts (0.268 moles) of dodecene-1, 9 parts (0.5 moles) of water, about 160 parts of acetone, 1.3 parts (0.0025 moles) of $H_2PtCl_6 \cdot 6H_2O$, and 2.8 parts (0.012 moles of $SnCl_2 \cdot 2H_2O$. The autoclave was sealed, flushed twice with carbon monoxide and pressured to 2,800 p.s.i. with Co. The autoclave was then heated with stirring to 90° C.; the reaction was continued at this temperature for 2 hours. At the end of this time, the vessel was cooled and the liquid product was discharged.

The product was analyzed by Gas Liquid Chromatography (glc). Conversion of olefin was 99 percent; the acid yield was 72 percent, of which 87 percent was n-tridecanoic acid.

When the initial CO pressure was increased to 4,100 p.s.i. in the process of Example 7, the acid yield was 82 percent of which 85 percent was n-tridecanoic acid.

Using 71.3 parts of dodecene-1, about 120 parts of acetone, a CO pressure of 3,750 and a reaction time of 1 hour in Example 7, the conversion was 78 percent; the yield of acid was 74 percent of which 86 percent was n-tridecanoic acid.

EXAMPLE 8

A suitably sized autoclave fitted with a magnetic stirrer was charged with 143.5 parts (0.537 moles) of dodecene-1, 18 parts (1.0 moles) of water, about 240 parts of acetone, 2.6 parts (0.005 moles) of $H_2PtCl_6 \cdot 6H_2O$, and 5.6 parts (0.024 moles) of $SnCl_2 \cdot 2H_2O$. The autoclave was sealed, flushed twice with carbon monoxide and pressured to 3,000 p.s.i. with CO. The autoclave was then heated with stirring to 90° C. and the pressure rose to 3,850 p.s.i. The reaction was continued at this temperature for 5 hours. At the end of this time, the vessel was cooled and the liquid product was discharged.

The product was analyzed by Gas Liquid Chromatography (glc). Conversion of olefin was 100 percent; the acid yield was 70 percent, of which 82 percent was n-tridecanoic acid.

Good results are obtained when the reaction of Example 8 is carried out under an initial CO pressure of 500 p.s.i., 1,000 p.s.i., 7,500 p.s.i., 10,000 p.s.i., and 15,000 p.s.i.

Reaction temperatures of 75°, 100°, 110°, 120°, and 150° C. also produce good yields of acids in carrying out the process of Example 8.

EXAMPLE 9

A suitably sized autoclave fitted with a magnetic stirrer was charged with 72.1 parts (0.268 moles) of dodecene-1, 9 parts (0.5 moles) of water, about 120 parts of acetone, 1.3 parts (0.0025 moles) of $H_2PtCl_6 \cdot 6H_2O$, and 4.8 parts (0.021 moles) of $SnCl_2 \cdot 2H_2O$. The autoclave was sealed, flushed twice with carbon monoxide and pressured to 2800 p.s.i. with CO. The autoclave was then heated with stirring to 90° C.; the reaction was continued at this temperature for 2 hours. At the end of this time, the vessel was cooled and the liquid product was discharged.

The product was analyzed by Gas Liquid Chromatography (glc). Conversion of olefin was 100 percent; the acid yield was 62 percent, of which 85 percent was n-tridecanoic acid.

When 2.8 parts (0.012 moles) of $SnCl_2 \cdot 2H_2O$ was used in Example 9, the conversion was 98 percent, with an acid yield of 63 percent, 87 percent of which was n-tridecanoic acid. Using 1.7 parts (0.0076 moles) of $SnCl_2 \cdot 2H_2O$ in Example 9, the conversion was 35 percent with an acid yield of 69 percent, 88 percent of which was n-tridecanoic acid.

EXAMPLE 10

A suitably sized autoclave fitted with a magnetic stirrer was charged with about 45.6 parts (0.17 moles) of dodecene-1, 9 parts (0.5 moles) of water, about 160 parts of acetone, 0.67 parts (0.0025 moles) of $PtCl_2$, 2.26 parts (0.010 moles) of $SnCl_2 \cdot 2H_2O$ and about 0.476 parts (0.005 moles) of concentrated HCl. The autoclave was sealed, flushed twice with carbon monoxide and pressured to 4,000 p.s.i. with CO. The autoclave was then heated with stirring to 90° C. and the pressure rose to 4,800 p.s.i. The reaction was continued at this temperature for 2 hours. At the end of this time, the vessel was cooled and the liquid product was discharged.

The product was analyzed by Gas Liquid Chromatography (glc). Conversion of olefin was 100 percent; the acid yield was 70 percent, of which 86 percent was n-tridecanoic acid.

The HCl in Example 10 may be replaced by other halide ion sources such as NaCl with equivalent effectiveness.

When Example 10 was repeated omitting the small amount of HCl, the reaction rate and acid yield were reduced.

EXAMPLE 11

A suitably sized autoclave fitted with a magnetic stirrer was charged with 57.4 parts (0.675 moles) of hexene-1, 12.2 parts (0.675 moles) of water, about 300 parts of acetone, 7.8 parts (0.015 moles) of $H_2PtCl_6 \cdot 6H_2O$, and 17.3 parts (0.077 moles) of $SnCl_2 \cdot 2H_2O$. The autoclave was sealed, flushed twice with carbon monoxide and pressured to 2,500 p.s.i. with CO. The autoclave was then heated with stirring to 90° C. and the pressure rose to 3,000 p.s.i. The reaction was continued at this temperature for 5 hours. At the end of this time, the vessel was cooled and the liquid product was discharged.

The product was analyzed by Gas Liquid Chromatography (glc). The acid yield was 62 percent, of which about 75 percent was n-heptanoic acid.

The following olefins produce similar yields of the linear (normal) acids as indicated.

styrene → 3-phenyl propionic acid
4,6-dimethyl heptene-1 → 5,7-dimethyl-n-octanoic acid
ethylene → propionic acid
triacontene-1 → n-henatriacontanoic acid
octene-1 → n-nonanoic acid
butene-1 → n-pentanoic acid
hexadecene-1 → n-heptadecanoic acid
cyclohexene → cyclohexane carboxylic acid
1,4-octadiene → n-nonanoic acid
tetradecene-1 → n-pentadecanoic acid
tetracosene-1 → n-pentacosanoic acid
1,6-hexadecadiene → n-heptadecanoic acid
1,7-octadiene → sebacic acid
pentadecene-1 → n-hexadecanoic acid

EXAMPLE 12

A suitably sized autoclave fitted with a magnetic stirrer is charged with 43 parts (1 mole) of propylene, 36 parts (2 moles) of water, 79 parts of methyl isobutyl ketone, 0.02 moles of $K_2PtCl_6$, and 0.06 moles of $SnCl_2 \cdot 2H_2O$. The autoclave is sealed, flushed with carbon monoxide and pressured to 5,000 p.s.i. with CO. The autoclave is then heated with stirring to 30° C.; the reaction is continued at this temperature for 10 hours. At the end of this time, the vessel is cooled and the liquid product is discharged.

A good yield of n-butanoic acid is obtained.

Good results are also obtained when the reaction in Example 12 is allowed to continue for 1, 5, 15, or 24 hours.

EXAMPLE 13

A suitably sized autoclave fitted with a magnetic stirrer is charged with 313 parts (1 mole) of tetracosene-1, 90 parts (5 moles) of water, 200 parts of 1,2-dimethoxyethane, 0.05 moles of $PtCl_4$, and 0.30 moles of $GeCl_4$. The autoclave is sealed, flushed twice with carbon monoxide and pressured to 10,000 p.s.i. with CO. The autoclave is then heated with stirring to 150° C.; the reaction is continued at this temperature for 30 minutes. At the end of this time, the vessel is cooled and the liquid product is discharged.

A good yield of n-pentacosanoic acid is obtained.

Similar results are obtained when the CO pressure is 15,000 p.s.i., 5,000 p.s.i., or 500 p.s.i.

The examples above clearly illustrate the process of the present invention and its salient features. These examples do not necessarily limit the present process but do serve to illustrate various embodiments.

The mixtures of carboxylic acids as pointed out previously may be separated into the various components if desired by procedures available in the art; on the other hand, these mixtures, which contain the linear acids predominantly, can be used without any prior separation. These acid products have many uses. For example, they are useful as intermediates for the preparation of esters; these acids can be saponified to form soaps; they may also be used as lubricants, as elastomer additives and the like. These are but a few examples of the many uses these acid products have.

The process of the present invention and its embodiments have been described above. Claims to this invention are as follows:

We claim:

1. A catalytic process for preparing carboxylic acids which comprises reacting a $C_2$–$C_{30}$ olefin characterized by having
   a. at least one alpha carbon-to-carbon double bond, and
   b. a hydrogen atom on the two-carbon atom of said α-double bond,
   with carbon monoxide and water in a liquid reaction medium selected from $C_3$–$C_{11}$ alkyl ketones and $C_4$–$C_{16}$ alkyl ethers using as the catalyst a combination of
   a. an inorganic salt of a metal selected from the class consisting of tin and germanium, and
   b. an inorganic salt of platinum.

2. The process of claim 1 wherein sufficient liquid reaction medium is present to render the reactant mixture substantially miscible at a reaction temperature ranging from about 30° C. to about 150° C.

3. The process of claim 1 wherein the reaction is carried out at a temperature of from about 30° C. to about 150° C. and at a pressure of from 500 p.s.i. up to 15,000 p.s.i.

4. The process of claim 1 wherein the molar ratio of olefin:water is from 1:1 to about 1:7.

5. The process of claim 1 wherein said olefin has from six to about 24 carbon atoms.

6. The process of claim 1 wherein said olefin is a monoolefin.

7. The process of claim 1 wherein said reaction medium is a $C_3$–$C_{11}$ alkyl ketone.

8. The process of claim 1 wherein said reaction medium is $C_4$–$C_{16}$ alkyl ether.

9. The process of claim 1 wherein said catalyst component (a) is a halide of tin or germanium and said catalyst component (b) is selected from platinum halides, haloplatinum acids, and alkali metal salts of haloplatinum acids wherein the halogen constituent has an atomic number of at least 17.

10. The process of claim 9 wherein said halogen constituent is chlorine.

11. The process of claim 9 wherein said catalyst component (a) is a tin halide and said catalyst component (b) is a haloplatinum acid.

12. The process of claim 9 wherein said catalyst component (a) is a tin halide and said catalyst component (b) is an alkali metal salt of haloplatinum acid.

13. The process of claim 11 wherein the halogen constituent is chlorine.

14. The process of claim 12 wherein the halogen constituent is chlorine.

15. The process of claim 9 wherein said olefin is a monoolefin, the reaction temperature is from about 75° C. to about 110° C. and the reaction pressure is from about 500 p.s.i. to about 6,000 p.s.i.

16. The process of claim 15 wherein said catalyst is a combination of $SnCl_2$ and $H_2PtCl_6$.

17. The process of claim 16 wherein said olefin is selected from dodecene and hexene.

18. The process of claim 17 wherein said reaction medium is selected from acetone, 1,4-dioxane and 1,2-dimethoxy ethane.

* * * * *

PO-1050
(5/69)

UNITED STATES PATENT OFFICE
CERTIFICATE OF CORRECTION

Patent No. 3,718,676      Dated February 27, 1973

Inventor(s) Lawrence J. Kehoe et al

It is certified that error appears in the above-identified patent and that said Letters Patent are hereby corrected as shown below:

In Column 3, line 24 - "$H_2PtCl_6 \cdot H_2O$" should read -- $H_2PtCl_6 \cdot 6H_2O$ --

In Column 7, line 3 - "$H_2PtCl_6 \cdot H_2O$" should read -- $H_2PtCl_6 \cdot 6H_2O$ --

In Column 7, line 16 - "$H_2PtCl_6 \cdot H_2O$" should read -- $H_2PtCl_6 \cdot 6H_2O$ --

In Column 7, line 31 - "$H_2PtCl_6 \cdot H_2O$" should read -- $H_2PtCl_6 \cdot 6H_2O$ --

In Column 7, line 42 - "$H_2PtCl_6 \cdot H_2O$" should read -- $H_2PtCl_6 \cdot 6H_2O$ --

In Column 8, line 9 - "Co" should read -- CO --

Signed and sealed this 10th day of July 1973.

SEAL)
ttest:

DWARD M. FLETCHER, JR.      Rene Tegtmeyer
ttesting Officer      Acting Commissioner of Patents